April 11, 1939.　　　C. PFANSTIEHL　　　2,154,181
PEN NIB
Filed June 15, 1936
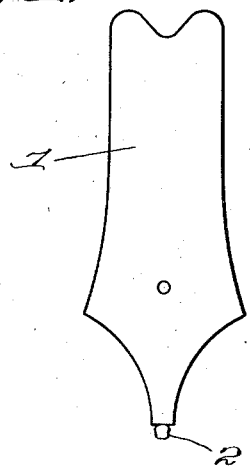
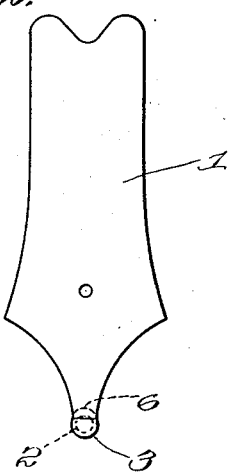
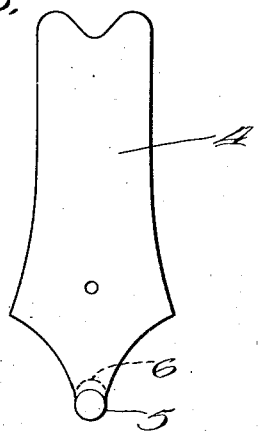
Inventor:
Carl Pfanstiehl.
By Dynforth, Lee, Chritton & Wiles.
Attys.

Patented Apr. 11, 1939

2,154,181

UNITED STATES PATENT OFFICE 2,154,181

PEN NIB

Carl Pfanstiehl, Highland Park, Ill., assignor to Pfanstiehl Chemical Company, a corporation of Illinois Application June 15, 1936, Serial No. 85,361

2 Claims. (Cl. 120—109)

This invention relates to pen nibs and particularly to pen nibs comprising stainless steel.

In my Patents No. 2,005,752, issued June 25, 1935, and No. 2,032,887, issued March 3, 1936, is described a process of tacking and welding tips to pen nibs and a method of forming integral tips upon pen nib material. In these processes and in my copending applications No. 36,229, filed August 14, 1935, and No. 59,229, filed January 15, 1936, the pen nib or tip material is fused and is very quickly cooled and frozen. As described in Patent 2,005,752, and in my copending application, Ser. No. 742,493, filed September 1, 1934, this quick cooling is highly advantageous in connection with the formation of integral tips by fusion upon steel which has the property of air hardening to produce a shiny and very hard writing surface.

In connection with stainless steel nibs, particularly stainless steel nibs of the common 18% chromium 8% nickel austenitic type, such heating and quick cooling of the fused material produces on the contrary a softer metal.

Therefore stainless steel pen nibs of this type are not annealed, but are worked to impart maximum hardness.

The invention is illustrated in the drawing, in which—

Fig. 1 illustrates a stainless steel nib composed of 18—8 stainless steel and having tacked thereto an iridium or other high melt point metal tip 2; Fig. 2 represents the same nib with the tip fused thereto as indicated at 3; and Fig. 3 represents a stainless steel nib 4 having a tip 5 of the same metal formed thereon by fusion.

In Figs. 2 and 3, the dotted line 6 represents approximately the portion of the pen nib below which the corrosion resistance of the nib material is remarkably increased.

It has now been discovered, however, that treatment of a stainless steel pen nib by fusion and rapid cooling, as shown in such patents or otherwise, either in connection with the production of a pen nib having an integral tip of stainless steel, or in connection with stainless steel nibs having tips of other material, produces fused stainless steel material about the tip having remarkably increased corrosion resistance to ink, as compared not only to unheated alloy, but even to the most carefully annealed stainless steel. This increased resistance to corrosion is so great that it more than balances the increased softness of the metal and results in substantially longer life. For example, a stainless steel nib having an iridium tip welded thereto in the manner described in my Patent 2,005,752 and immersed in ferric chloride solution (which is equivalent in corrosive effect to ink, but much more rapid in its action) will be unaffected at the tip portion and that portion of the nib metal which was melted, in the time that the remainder of the pen nib will be practically completely dissolved.

The same result is secured when a stainless steel nib of this type has a tip fused upon it in the manner described in said Patent No. 2,005,752; the tip formed by fusion has immensely increased corrosion resistance to ink in all parts which were fused.

The operation heretofore described anneals only a small portion of the nib and does not affect the necessary flexibility of the remainder thereof.

The invention is also applicable to such stainless steel in combination with any tip material, for example, the alloy disclosed in my co-pending application, Serial No. 753,220, filed November 15, 1934, is particularly suitable for this purpose.

The foregoing detailed description has been given for clearness of understanding only, and no unnecessary limitations should be understood therefrom, but the appended claims should be construed as broadly as permissible in view of the prior art.

I claim:

1. A pen point comprising a stainless steel nib of the 18—8 type welded to a hard metal tip, the stainless steel metal adjacent and about a portion of the tip being rendered more corrosion-resistant by quenching from a high temperature, and the remaining portion of the nib having substantially its original characteristics.

2. A stainless steel pen point comprising a stainless steel pen nib and a stainless steel tip of the 18—8 type integral with the nib, the tip being heat-treated to increase its corrosion-resistance, and the nib, except that immediately adjacent the tip, having its original characteristics of flexibility and hardness.

CARL PFANSTIEHL.